United States Patent
Sishtla

(10) Patent No.: US 10,612,551 B2
(45) Date of Patent: Apr. 7, 2020

(54) COMPRESSOR MOTOR WINDAGE LOSS MITIGATION

(75) Inventor: Vishnu M. Sishtla, Manlius, NY (US)

(73) Assignee: Carrier Corporation, Palm Beach Gardens, FL (US)

( * ) Notice: Subject to any disclaimer, the term of this patent is extended or adjusted under 35 U.S.C. 154(b) by 913 days.

(21) Appl. No.: 13/993,449

(22) PCT Filed: May 11, 2012

(86) PCT No.: PCT/US2012/037517
§ 371 (c)(1),
(2), (4) Date: Jun. 12, 2013

(87) PCT Pub. No.: WO2012/166325
PCT Pub. Date: Dec. 6, 2012

(65) Prior Publication Data
US 2013/0302184 A1      Nov. 14, 2013

Related U.S. Application Data

(60) Provisional application No. 61/491,509, filed on May 31, 2011.

(51) Int. Cl.
*F04D 13/06*          (2006.01)
*F04D 29/58*          (2006.01)
(Continued)

(52) U.S. Cl.
CPC ..... *F04D 13/0606* (2013.01); *F04D 25/0606* (2013.01); *F04D 29/104* (2013.01);
(Continued)

(58) Field of Classification Search
CPC ............ F04D 29/5806; F04D 29/5826; F04D 13/0606; F04D 25/0606; F04D 29/584;
(Continued)

(56) References Cited

U.S. PATENT DOCUMENTS 4,032,312 A      6/1977   Anderson
4,301,375 A     11/1981   Anderson
(Continued)

FOREIGN PATENT DOCUMENTS

CN       1281100 A      1/2001
CN     101458003 A      6/2009
(Continued)

OTHER PUBLICATIONS

International Search Report and Written Opinion for PCT/US2012/037517, dated Sep. 4, 2012.
(Continued)

*Primary Examiner* — Bryan M Lettman
(74) *Attorney, Agent, or Firm* — Bachman & LaPointe, P.C.

(57) ABSTRACT

A compressor (22) has a housing assembly (40) with a suction port (24), a discharge port (26), and a motor compartment (60). An electric motor (42) has a stator (62) within the motor compartment and a rotor (64) within the stator. The rotor is mounted for rotation about a rotor axis (500). One or more working elements (44) are coupled to the rotor to be driven by the rotor in at least a first condition so as to draw fluid in through the suction port and discharge the fluid from the discharge port. A gap (80) is between the rotor and stator. The gap is isolated (140, 142) from an outer portion (144) of the motor compartment. The outer portion is exposed to the stator. One or more passages (150) are positioned to draw fluid from the gap in the first condition.

22 Claims, 3 Drawing Sheets

(51) Int. Cl.

| | | |
|---|---|---|
| H02K 1/20 | (2006.01) | |
| H02K 3/24 | (2006.01) | |
| H02K 9/193 | (2006.01) | |
| H02K 9/197 | (2006.01) | |
| F04D 29/10 | (2006.01) | |
| H02K 5/20 | (2006.01) | |
| F04D 29/12 | (2006.01) | |
| F04D 25/06 | (2006.01) | |

(52) U.S. Cl.
CPC ......... *F04D 29/124* (2013.01); *F04D 29/584* (2013.01); *F04D 29/5806* (2013.01); *F04D 29/5826* (2013.01); *H02K 1/20* (2013.01); *H02K 3/24* (2013.01); *H02K 5/20* (2013.01); *H02K 9/193* (2013.01); *H02K 9/197* (2013.01)

(58) Field of Classification Search
CPC ...... F04D 29/10; F04D 29/102; F04D 29/104; F04D 29/12; F04D 29/122; F04D 29/124; F04D 29/08; F04D 29/083; F04D 13/062; H02K 1/20; H02K 1/32; H02K 3/24; H02K 5/20; H02K 9/193; H02K 9/19; H02K 9/197; H02K 9/10; H02K 9/00; H02K 9/005; H02K 5/128; H02K 5/1285; H02K 5/132
See application file for complete search history.

(56) References Cited

U.S. PATENT DOCUMENTS

| | | |
|---|---|---|
| 4,381,650 A | 5/1983 | Mount |
| 4,399,663 A | 8/1983 | Hesler |
| 4,404,811 A | 9/1983 | Mount et al. |
| 4,404,812 A | 9/1983 | Zinsmeyer |
| 5,246,349 A | 9/1993 | Hartog |
| 5,354,184 A | 10/1994 | Forni |
| 5,848,538 A | 12/1998 | Tischer |
| 6,698,929 B2 | 3/2004 | Choi et al. |
| 7,439,702 B2 | 10/2008 | Smith et al. |
| 7,633,193 B2 * | 12/2009 | Masoudipour ........... H02K 9/19 310/54 |
| 2003/0042817 A1 * | 3/2003 | Tsuneyoshi ........... H02K 9/197 310/216.014 |
| 2007/0018516 A1 * | 1/2007 | Pal et al. .................... 310/61 |
| 2007/0108934 A1 | 5/2007 | Smith et al. |
| 2007/0212232 A1 * | 9/2007 | De Larminat ........ F04C 29/045 417/83 |
| 2007/0271956 A1 | 11/2007 | Smith et al. |
| 2008/0199326 A1 * | 8/2008 | Masoudipour et al. ...... 417/247 |
| 2010/0014990 A1 * | 1/2010 | Nijhuis ................. F04D 17/12 417/53 |
| 2011/0150628 A1 * | 6/2011 | Wagner ........................... 415/1 |
| 2011/0194960 A1 * | 8/2011 | Wu ...................... F04D 29/063 418/1 |

FOREIGN PATENT DOCUMENTS

| | | | | |
|---|---|---|---|---|
| CN | 101583801 A | | 11/2009 | |
| CN | 101978169 A | | 2/2011 | |
| DE | 102008038787 | * | 2/2010 | ............ F04D 27/02 |
| DE | 102008038787 A1 | | 2/2010 | |
| EP | 1482179 A1 | | 12/2004 | |
| EP | 2103810 A1 | | 9/2009 | |
| WO | 91/17361 A1 | | 11/1991 | |
| WO | WO2011014934 | * | 2/2011 | |

OTHER PUBLICATIONS

NIKKISO Pumps America Inc., Model VIP-801/806 API Canned Motor Pump, Apr. 2009, Houston, TX.
Carrier Corporation, EVERGREEN 19XR, XRV High-Efficiency Hermetic Centrifugal Liquid Chiller 50/60 Hz HFC-134a, 2010, Syracuse, NY.
Chinese Office Action for CN201280026321.8, dated Jul. 1, 2015.
Chinese Office Action for CN201280026321.8, dated Feb. 24, 2016.
European Office Action dated Jun. 28, 2018 for EP Patent Application No. 12729259.7.
First Examination Report dated Apr. 24, 2019 for Indian Patent Application No. 9696/DELNP/2013.

* cited by examiner

COMPRESSOR MOTOR WINDAGE LOSS MITIGATION

CROSS-REFERENCE TO RELATED APPLICATION

Benefit is claimed of U.S. Patent Application Ser. No. 61/491,509, filed May 31, 2011, and entitled "Compressor Windage Mitigation", the disclosure of which is incorporated by reference herein in its entirety as if set forth at length.

BACKGROUND

The disclosure relates to compressors. More particularly, the disclosure relates to electric motor-driven hermetic or semi-hermetic compressors.

One particular use of electric motor-driven compressors is liquid chillers. An exemplary liquid chiller uses a hermetic centrifugal compressor. The exemplary unit comprises a standalone combination of the compressor, the cooler unit, the chiller unit, the expansion device, and various additional components. The exemplary compressor includes a transmission intervening between the motor rotor and the impeller to drive the impeller at a faster speed than the motor.

The motor is exposed to a bypass of refrigerant flow to cool the motor. The exposure of the motor rotor to refrigerant produces losses known as windage. Windage losses increase with motor speed and with density of refrigerant exposed to the rotor.

In the United States, chillers are subject to American Refrigeration Institute (ARI) Standard 550. This standard identifies four reference conditions characterized by a percentage of the chiller's rated load (in tons of cooling) and an associated condenser water inlet/entering temperature. Operation is to achieve a chilled water outlet/leaving temperature of 44 F (6.67 C). The four conditions are: 100%, 85 F (29.44 C); 75%, 75 F (23.89 C), 50%, 65 F (18.33 C); and 25%, 65 F (18.33 C also). These conditions (or similar conditions along a curve of connecting them) may provide relevant conditions for measuring efficiency. In API testing, the water flow rate through the cooler is 2.4 gallons per minute per ton of cooling (gpm/ton) (0.043 liters per second per kilowatt (l/s/kW)) and condenser water flow rate is 3 gpm/ton (0.054 l/s/kW).

SUMMARY

One aspect of the disclosure involves a compressor having a housing assembly with a suction port, a discharge port, and a motor compartment. An electric motor has a stator within the motor compartment and a rotor within the stator. The rotor is mounted for rotation about a rotor axis. One or more working elements are coupled to the rotor to be driven by the rotor in at least a first condition so as to draw fluid in through the suction port and discharge the fluid from the discharge port. A gap is between the rotor and stator. The compressor includes means for isolating the gap from an outer portion of the motor compartment. The outer portion is exposed to the stator. One or more passages are positioned to draw fluid from the gap in the first condition.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
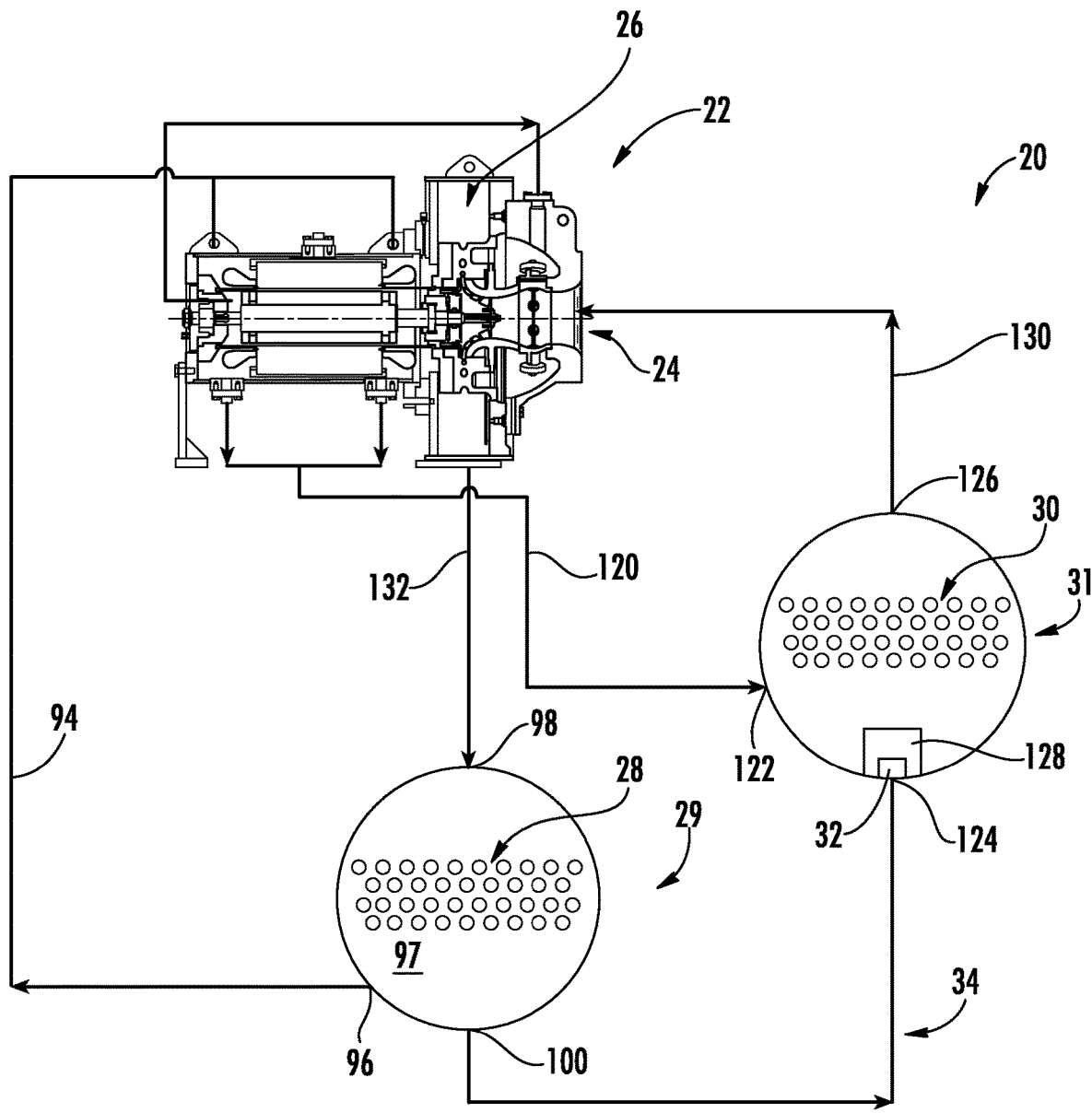
FIG. 1 is a partially schematic view of a chiller system.

FIG. 1 shows a vapor compression system 20. The exemplary vapor compression system 20 is a chiller system. The system 20 includes a compressor 22 having a suction port (inlet) 24 and a discharge port (outlet) 26. The system further includes a first heat exchanger 28 in a normal operating mode being a heat rejection heat exchanger (e.g., a gas cooler or condenser). In an exemplary system based upon an existing chiller, the heat exchanger 28 is a refrigerant-water heat exchanger in a condenser unit 29 where the refrigerant is cooled by an external water flow.

The system further includes a second heat exchanger 30 (in the normal mode a heat absorption heat exchanger or evaporator). In the exemplary system, the heat exchanger 30 is a refrigerant-water heat exchanger for chilling a chilled water flow within a chiller unit 31. An expansion device 32 is downstream of the heat rejection heat exchanger and upstream of the heat absorption heat exchanger 30 along the normal mode refrigerant flowpath 34 (the flowpath being partially surrounded by associated piping, etc.). The exemplary refrigerant-water heat exchangers 28 and 30 comprise tube bundles carrying water flow and in heat exchange relation with refrigerant passing around the bundles within the shelves of the units 29 and 31. For ease of illustration, the water inlets and outlets of the heat exchangers are not shown.

An exemplary compressor is a centrifugal compressor having a housing assembly (housing) 40. The housing assembly contains an electric motor 42 and one or more working elements 44 (an impeller for a centrifugal compressor; a scroll of a scroll compressor; or pistons for a reciprocating compressor) drivable by the electric motor in the first mode to compress fluid (refrigerant) to draw fluid (refrigerant) in through the suction port, compress the fluid, and discharge the fluid from the discharge port. The exemplary centrifugal working element(s) comprise a rotating impeller directly driven by the motor. As is discussed below, the exemplary centrifugal compressor eliminates the transmission of the baseline prior art compressor. To compensate, the motor is driven at a higher speed. With the higher speed driving, the windage losses would otherwise be increased.

The housing defines a motor compartment 60 containing a stator 62 of the motor within the compartment. A rotor 64 of the motor is partially within the stator and is mounted for rotation about a rotor axis 500. The exemplary mounting is via one or more bearing systems 66, 68 mounting a shaft 70 of the rotor to the housing assembly. The exemplary impeller 44 is mounted to the shaft (e.g., an end portion 72) to rotate therewith as a unit about the axis 500. The exemplary bearing system 66 mounts an intermediate portion of the shaft to an intermediate wall 74 of the housing assembly. The exemplary bearing system 68 mounts an opposite end portion of the shaft to an end wall portion 76 of the housing assembly. Between the walls 74 and 76, the housing includes an outer wall 78 generally surrounding the motor compartment.

There is a gap 80 between the rotor and the stator (e.g., between a lamination 82 of the rotor and a coil 84 of the stator). The exemplary motor directly drives the impeller in the absence of a transmission. Therefore, the motor may be driven at a higher speed than the motor of an equivalent compressor having a transmission. An exemplary operational speed range of the rotor is 900-18,000 rpm (15-300 Hz). Especially at the higher portion of this range, the presence of refrigerant in the gap may produce drag losses known as windage. Limiting pressure within the gap limits these windage losses. With the exemplary semi-hermetic compressor, however, it is desirable to introduce fluid into the motor compartment 60 to cool the motor. In the exemplary system, this introduction is achieved by ports 90 and 92 in the housing. These ports receive refrigerant via a branch line 94 (FIG. 1) extending from a port 96 along the condenser unit 29, intermediate the condenser inlet 98 and outlet 100. This refrigerant flow is removed from the motor compartment via drains 110 and 112 coupled to a line 120 (FIG. 1) which extends to a port 122 of the cooler unit intermediate the cooler inlet 124 and cooler outlet 126. Thus, the motor compartment would essentially be at the evaporator pressure which is essentially the suction pressure $P_S$. The exemplary inlet 124 feeds a distributor 128 upstream of the intermediate port 122. FIG. 1 further shows a compressor suction line 130 from the cooler unit outlet 126 to the suction port 24 and a compressor discharge line 132 from the compressor discharge port 26 to the condenser unit inlet 98.

Accordingly, the exemplary compressor includes means for isolating the gap from an outer/outboard portion of the motor compartment and for limiting pressure in the gap. Exemplary means for isolating include one or more sleeves 140, 142 extending axially from ends of the stator to isolate an outboard portion 144 of the motor compartment from an inboard portion 146 of the motor compartment which includes the gap 80. In addition to that means for isolating, the exemplary means for limiting pressure further comprises one or more passageways 150 positioned to draw fluid (refrigerant) from the gap in at least a first condition of compressor operation. Fluid may need to be drawn from the gap either due to leakage into the gap (discussed below) or due to intended metering of fluid into the inboard portion of the motor compartment for purposes of: (a) lubrication; and/or (b) cooling the rotor or an inboard (inner diameter (ID)) surface of the stator (albeit at a lower pressure than in the outboard portion 144 of the motor compartment).

For example, an exemplary leakage path may pass through seals associated with the bearing systems. An exemplary passageway 150 provides communication between the motor compartment inboard portion to a suction housing plenum 160. In the exemplary compressor configuration, the suction housing plenum surrounds the ring 162 of inlet guide vanes 166 and is essentially at a pressure the same as a pressure $P_V$ immediately downstream of the vanes. The exemplary compressor is modified from a baseline transmission-equipped compressor wherein a vent 164 communicates with the suction housing plenum to vent the transmission. In the exemplary compressor, this vent 164 is re-used as part of the passageway 150. The net effect of the passageway 150 is to maintain the gap at a pressure $P_G$ which is lower than a pressure $P_H$ of the housing outboard portion. With a suction pressure $P_S$ and a discharge pressure $P_D$, exemplary $P_H$ may be at or close to the suction pressure $P_S$ and $P_G$ at or close to the pressure $P_V$. For example, a difference between $P_H$ and $P_G$ may vary over an operational range of the compressor. A typical value of $P_H$ is 50 to 55 psia (345–379 kPa). The lower pressure $P_H$ is achieved by closing inlet guide vanes 166. At lower loads and speeds, the inlet guide vanes are relatively closed, thereby increasing their flow restriction and increasing $\Delta P$.

Table I shows exemplary $\Delta P$ for the four ARI load conditions in an exemplary system using R134a refrigerant:

TABLE I

| ARI Load (%) | Speed (%) | IGV Position (degrees) | $P_S$ (psia (kPa)) | $P_V$ (psia (kPa)) | $\Delta P$ (psi (kPa)) | Windage Loss Reduction (%) |
|---|---|---|---|---|---|---|
| 100 | 100 | 100 | 55 (379) | 51 (352) | 4 (28) | 7 |
| 75 | 88.3 | 84.9 | 55 (379) | 43.3 (299) | 11.7 (81) | 20 |
| 50 | 73.5 | 68.0 | 55 (379) | 34.7 (239) | 20.3 (140) | 35 |
| 25 | 70.7 | 35.4 | 55 (379) | 26.0 (179) | 29 (179) | 51 |

Centigrade temperatures and kPa pressures are conversions from the listed Fahrenheit and psi values and thus do not necessarily add and present excess precision. Although $\Delta P$ is small at 100% load, chillers are mostly operated at low load conditions. Accordingly, the overall benefit may more reflect the low load benefit. At very low speeds, it is seen that the $\Delta P$ is in excess of 25 psi (173 kPa) and that $P_V$ (which provides a good proxy for $P_G$) is less than 50% of $P_S$ (which provides the proxy for $P_H$). Even at 50% load, the $\Delta P$ is at least 20 psi (138 kPa) and $P_V$ is still less than 70% of $P_S$. Windage loss is proportional to density and to the third power of the speed and to the fourth power of gap radius. Reduction in windage loss at the higher speed is achieved by reduction in density. The windage loss reduction is not directly due to lower $\Delta P$ but due to lower density in the rotor cavity as a result of maintaining the gap at a lower pressure. This becomes particularly relevant if elimination of a transmission requires high motor speed at loads which, in a compressor having a transmission, would otherwise have much lower motor speed. In an exemplary reengineering from a transmission-type compressor, although speed is increased, gap radius may be decreased. The pressure reduction may combine with the gap radius reduction to fully or partially compensate for speed-related windage loss increases relative to the baseline.

Figure 2:
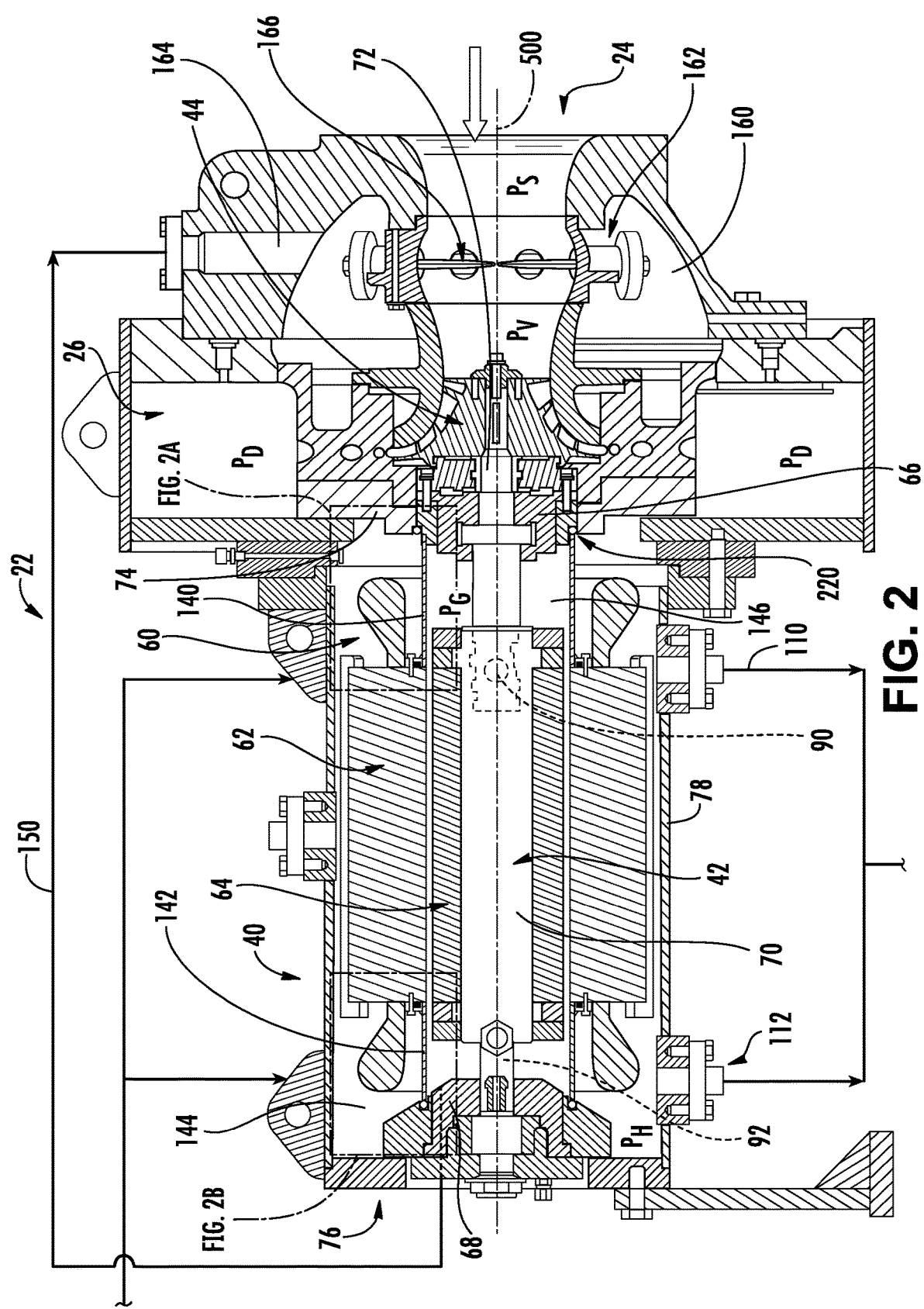
FIG. 2 is a longitudinal sectional view of a compressor of the chiller system.
Figure 2A:
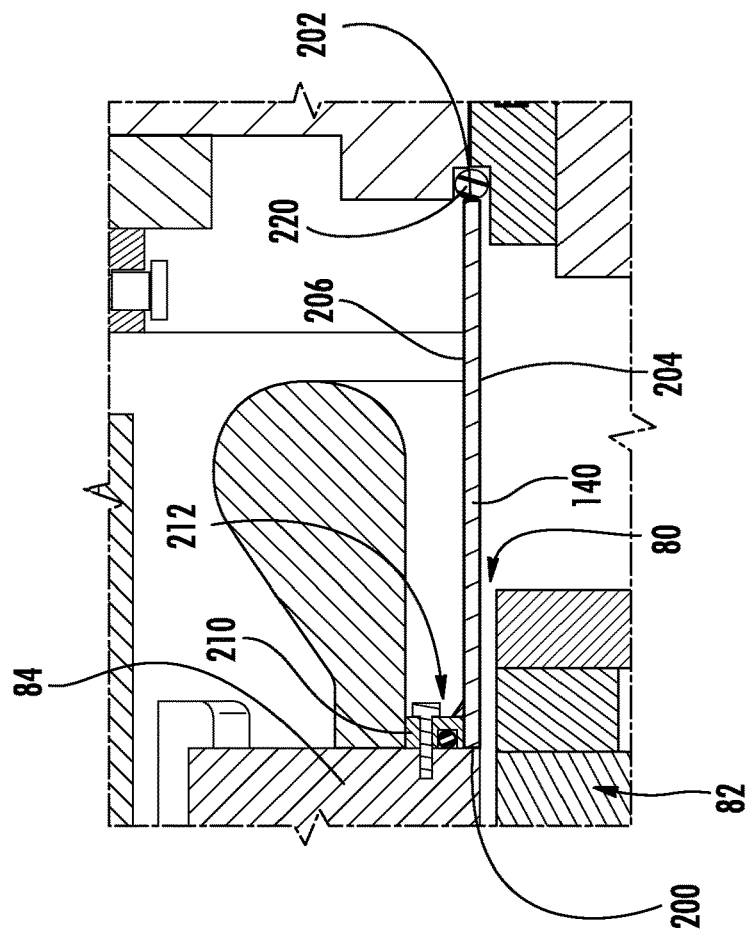
FIGS. 2A and 2B are enlarged semi-schematic view of isolating sleeves in the compressor of FIG. 2.
Figure 2B:
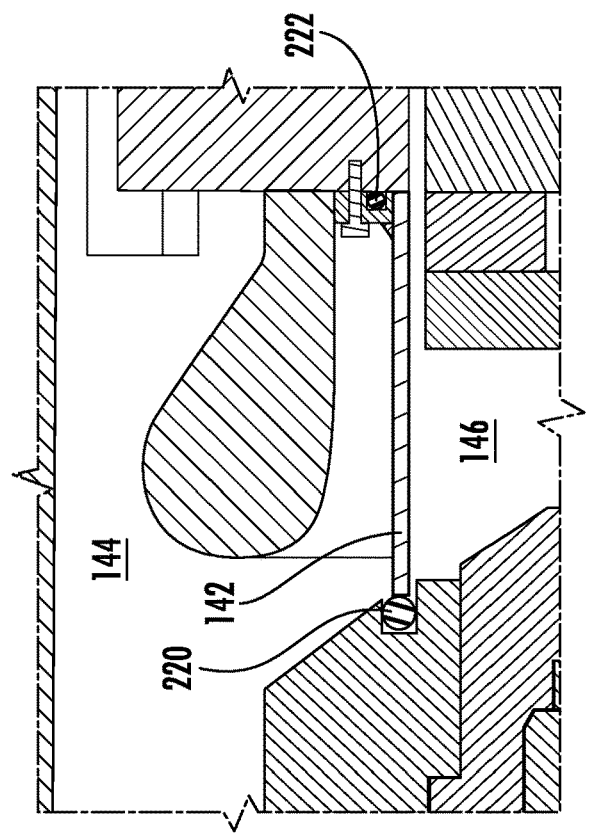

Exemplary sleeves are relatively rigidly connected to an adjacent portion of the stator or housing and more compliantly connected to or engaging the other. The sleeve can be either welded or fastened by fasteners such as bolts. In case of fasteners, the sleeve will likely have a mounting flange at the proximal end. Each exemplary sleeve 140, 142 is formed of tubular metal stock (e.g., carbon or stainless steel) and extends from a proximal end 200 to a distal end 202. The exemplary proximal ends 200 are mounted to respective ends of the stator core. As one example of mounting, a flange (e.g., also stainless steel) 210 is secured (e.g., welded) adjacent the end 200 and is fastened to the core such as via screws 212 extending into core laminations. The sleeves each have an inboard surface 204 and an outboard surface 206. The opposite distal end 202 of the sleeve may bear a seal or engage a seal for sealing with an adjacent portion of the housing structure. FIGS. 2A and 2B show seals 220 as elastomeric O-rings captured in associated grooves of adjacent portions of the housing (e.g., of respective adjacent bearing housings). The exemplary impeller end sleeve 140 has its proximal end secured to its adjacent end of the stator lamination stack and distal end engaging a seal carried by the bearing housing. The opposite sleeve 142 has a flange mounted to its adjacent end of the stator lamination stack and a distal end engaging a seal carried by the motor cover of a bearing housing carried by the motor cover. FIG. 2A and 2B also show seals 222 (e.g., elastomeric O-rings) in channels in the flanges 210 to seal the flanges to the stator core.

Alternative connections might simply involve welding the end 200 to the stator core laminations. Yet further alternative variations might involve mounting one or both sleeves to adjacent portions of the housing and having a seal engagement with the stator.

Exemplary sleeve materials are carbon steel or stainless steel or refrigerant-compatible plastic. Exemplary materials for the seals are refrigerant-compatible elastomers (e.g., O-rings)

Although an embodiment is described above in detail, such description is not intended for limiting the scope of the present disclosure. It will be understood that various modifications may be made without departing from the spirit and scope of the disclosure. For example, when applied to the reengineering of an existing compressor or a compressor in an existing application, details of the existing compressor or application may influence details of any particular implementation. Accordingly, other embodiments are within the scope of the following claims.

What is claimed is:

1. A compressor (22) comprising:
a housing assembly (40) having a suction port (24) and a discharge port (26) and a motor compartment (60);
an electric motor (42) having a stator (62) within the motor compartment and a rotor (64) within the stator, the rotor being mounted for rotation about a rotor axis (500);
one or more working elements (44) coupled to the rotor to be driven by the rotor in at least a first condition so as to draw an inlet flow of fluid in through the suction port and discharge a discharge flow of fluid out from the discharge port;
a gap (80) between the rotor and stator;
means for (140, 142) isolating said gap from an outer portion (144) of the motor compartment, said outer portion containing and exposed to the stator;
a first external port (90) and a second external port (92), said first and second ports positioned to communicate with the outer portion of the motor compartment to respectively introduce to and withdraw from the outer portion a cooling flow of fluid; and
one or more passages (150) positioned to draw a further flow of fluid from the gap in the first condition, wherein the further flow is a leakage from the cooling flow through one or more seals and the leakage is from the cooling flow of fluid between the first external port and second external port so as to bypass the second external port.

2. The compressor of claim 1 wherein:
the one or more passages are further positioned to pass said further flow of fluid from the gap to a suction housing plenum.

3. The compressor of claim 1 being a centrifugal compressor wherein:
the one or more working elements comprises (44) an impeller.

4. The compressor of claim 3 wherein:
the impeller is a single impeller mounted to the rotor for direct coaxial rotation therewith.

5. The compressor of claim 3 wherein:
the impeller has an inlet facing away from the motor.

6. The compressor of claim 3 wherein:
the compressor has a ring of inlet guide vanes.

7. A method for operating the compressor of claim 1 comprising:
driving the motor to draw said inlet flow of the fluid in through the suction port and discharge said discharge flow of the fluid from the discharge port;
drawing the further flow of fluid through the one or more passages from the gap so as to place the gap at a gap pressure ($P_G$); and
passing said cooling flow of fluid into the outer portion of the motor compartment so that the fluid in the outer portion of the motor compartment is at a pressure ($P_H$) which is greater than $P_G$.

8. The method of claim 7 wherein:
$P_G$ is less than 70% of $P_H$ in a portion of an operational range; and
$P_H$ is between a suction pressure $P_S$ and a discharge pressure $P_D$.

9. The method of claim 8 wherein the operating is at a first rotational speed of the motor and the method further comprises:
increasing a rotational speed of the motor to a second speed so as to increase a ratio of $P_H$ to $P_G$.

10. The method of claim 7 wherein:
the compressor is used in a vapor compression system having a heat rejection heat exchanger, an expansion device, and a heat absorption heat exchanger,
wherein:
said inlet flow of fluid is drawn through the suction port from the heat absorption heat exchanger;
said discharge flow of fluid is discharged from the discharge port to the heat rejection heat exchanger;
fluid from the heat rejection heat exchanger is expanded in the expansion device;
the fluid expanded in the expansion device is delivered to the heat absorption heat exchanger;
a portion of the discharge flow of fluid delivered to the heat rejection heat exchanger bypasses the expansion device and passes as said cooling flow of fluid to the motor compartment outer portion; and
fluid passed from the motor compartment outer portion is delivered to the heat absorption heat exchanger.

11. The method of claim 10 wherein:
a leakage flow of at least some of the cooling flow of fluid becomes the further flow of fluid drawn from the gap in the first condition.

12. The method of claim 10 wherein:
the drawing of the further flow of fluid through the one or more passages is to a suction housing plenum surrounding a ring of inlet guide vanes.

13. The method of claim 10 wherein:
over at least a portion of an operational range, the gap is kept at a lower pressure than a suction pressure.

14. The method of claim 13 wherein:
over at least the portion of the operational range, the lower pressure is less than 50% of the suction pressure.

15. The method of claim 7 wherein:
over at least a portion of an operational range, the gap is kept at a lower pressure than a suction pressure.

16. The method of claim 15 wherein:
over at least the portion of the operational range, the lower pressure is less than 50% of the suction pressure.

17. The compressor of claim 1 wherein:
the means is means for, over at least a portion of an operational range, keeping the gap at a lower pressure than a suction pressure.

18. The compressor of claim 1 wherein:
the first external port and the second external port are positioned to communicate with the outer portion of the motor compartment independently of the suction port and the discharge port.

19. The compressor of claim 1 wherein:
the one or more passages extend to a vent (164).

20. A vapor compression system comprising:
a compressor (22) for compressing a refrigerant and comprising:
- a housing assembly (40) having a suction port (24) and a discharge port (26) and a motor compartment (60);
- an electric motor (42) having a stator (62) within the motor compartment and a rotor (64) within the stator, the rotor being mounted for rotation about a rotor axis (500);
- one or more working elements (44) coupled to the rotor to be driven by the rotor in at least a first condition so as to draw an inlet flow of the refrigerant in through the suction port and discharge a discharge flow of said refrigerant out from the discharge port;
- a gap (80) between the rotor and stator;
- an outboard portion (144) of the motor compartment, said outboard portion containing and exposed to the stator; and
- one or more passages (150) positioned to draw a further flow of said refrigerant from the gap in the first condition bypassing the outboard portion of the motor compartment;

a first heat exchanger (28) coupled to the discharge port to receive at least a portion of the discharge flow of the refrigerant driven in a downstream direction in the first operational condition of the compressor;
an expansion device (32) downstream of the first heat exchanger;
a second heat exchanger (30) downstream of the expansion device and coupled to the suction port to return the refrigerant in the first operating condition; and
wherein:
- a refrigerant flowpath branch between the first and second heat exchangers passes a cooling flow through the motor compartment outboard portion between a first external port (90) and a second external port (92), bypassing the expansion device and exposing the stator to refrigerant in the outboard portion to cool the motor; and
- the leakage is from the cooling flow between the first external port and second external port so as to bypass the second external port.

21. The system of claim 20 wherein the refrigerant flowpath branch passes:
from a subcooler portion of the first heat exchanger;
to the motor compartment outboard portion; and
to a portion of the second heat exchanger downstream of a distributor (128).

22. The system of claim 21 wherein:
the first heat exchanger is a heat rejection heat exchanger; and
the second heat exchanger is a heat absorption heat exchanger.

* * * * *